UNITED STATES PATENT OFFICE.

HUGO BERTHOLD, OF NEW YORK, N. Y.

COLORING COMPOUND FOR ARTIFICIAL BUTTER.

SPECIFICATION forming part of Letters Patent No. 266,417, dated October 24, 1882.

Application filed June 14, 1882. (Specimens.)

*To all whom it may concern:*

Be it known that I, HUGO BERTHOLD, of the city, county, and State of New York, have invented a new and useful Improved Coloring-Matter for Use in the Manufacture of so-called "Artificial" or "Oleomargarine" Butter-Like Bodies; and I do hereby declare that the following is a full, clear, and exact description thereof.

To about four hundred pounds of oleomargarine-oil, when mixed with genuine butter and sour milk, or cream, sweet or sour, in the usual proportions, I add, after the usual churning, four pounds of the following mixture after the same has been thoroughly mixed—that is to say: fifty parts of sugar, finely powdered; thirty parts of glycerine, the purer the better. If the glycerine be not pure, then must take proportionately more. After the powdered sugar and the glycerine have been thoroughly mixed, add thereto twenty parts of annotto color, and thoroughly mix it with the previous mixture of sugar and glycerine until the mass forms a homogeneous or paste-like body. The above proportions are proportions by weight. This mixture is put into the churn containing the previously-churned oil and milk or cream, and also at the same time add about three pounds of oil of ben, and the churning is then continued about ten or fifteen minutes longer. The product is then treated as usual.

The results of using my coloring compound are that, owing to the annotto having been thoroughly mixed with the dissolved sugar and glycerine, it has become completely mingled with them, coloring their entire mass. Therefore, when put into the churn, there being such a large body of coloring-matter, every portion of the contents of the churn is more completely brought into contact with the coloring-matter; also, the sugar adds a more perfect butter-like taste to the product, and the glycerine and oil of ben remove the tendency which these artificial-butter-like bodies have to become flaky, brittle, or granular, so that when spread with the knife it is hard and of a tallowy texture, instead of smooth like genuine butter.

I do not limit myself to the exact proportions stated; but I have found them practically useful proportions.

Various coloring-matters have been combined with oleomargarine-oil, an example of which is shown and claimed in the reissued patent of H. Mege, dated June 13, 1882, and therefore I do not broadly claim a coloring agent, but limit my invention to the particular compound herein described and claimed.

I claim as new and desire to secure by Letters Patent—

A coloring compound for admixture with oleomargarine-oil after the usual churning operation, consisting of saccharine matter, glycerine, annotto, and oil of ben, mixed together in the manner and about in the proportions specified.

HUGO BERTHOLD.

Witnesses:
PHILLIPS ABBOTT,
JOHN J. O'BRIEN.